Feb. 16, 1965 L. J. SPERRY ET AL 3,170,099
MINIATURE VARIABLE CAPACITOR
Filed Feb. 8, 1962
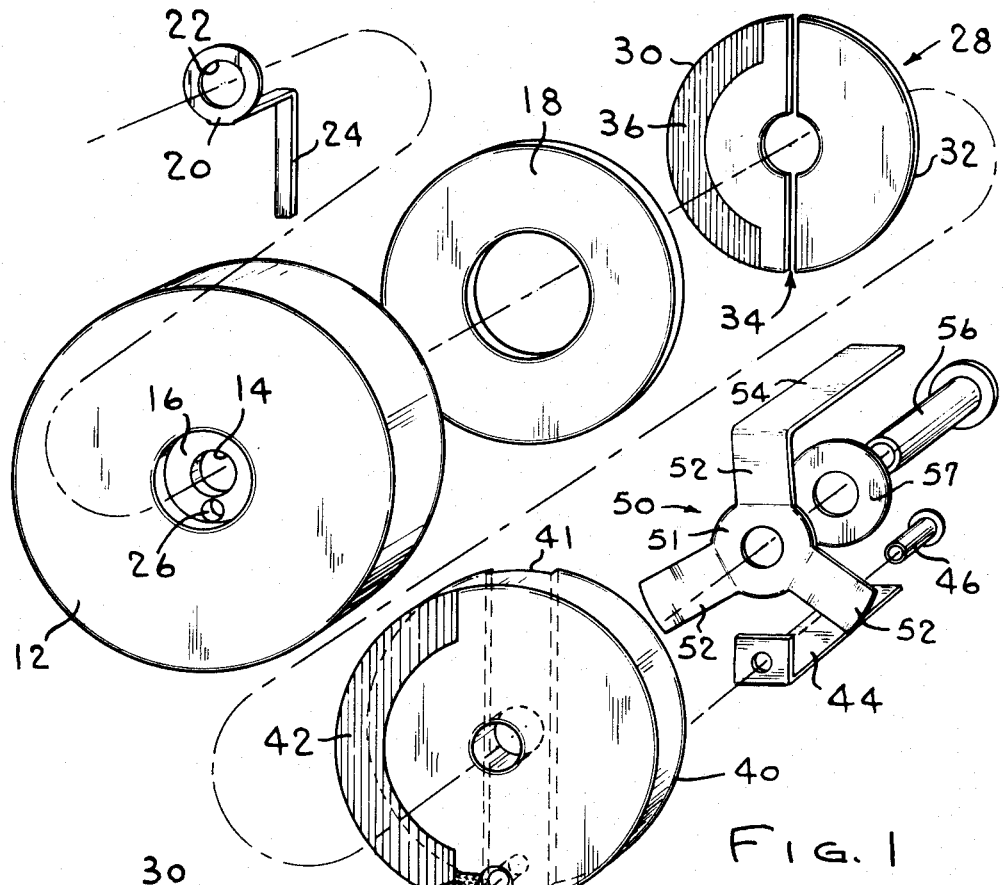
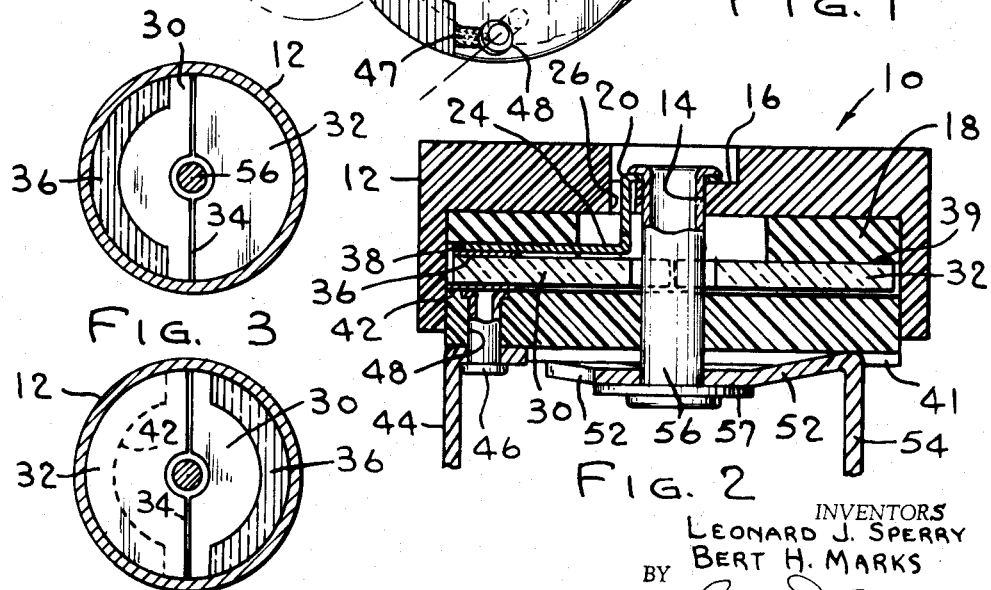
INVENTORS
LEONARD J. SPERRY
BERT H. MARKS
BY
ATTORNEY United States Patent Office 3,170,099
Patented Feb. 16, 1965

3,170,099
MINIATURE VARIABLE CAPACITOR
Leonard J. Sperry, Glendale, and Bert H. Marks, Milwaukee, Wis., assignors to Globe-Union, Inc., Milwaukee, Wis., a corporation of Delaware
Filed Feb. 8, 1962, Ser. No. 171,981
7 Claims. (Cl. 317—249)

This invention relates to variable capacitors and, more particularly, to a miniature variable ceramic capacitor.

The ratio of maximum to minimum capacitance of a tuning capacitor should be approximately 20:1 to tune a radio over the entire broadcast band. Ceramic capacitors have the requisite size for use in miniature radios, but they have a normal maximum to minimum capacitance ratio of from 5:1 to 7:1 which precludes their effective use in such applications. In the past attempts have been made to achieve a suitable capacitance ratio by employing ceramics having higher dielectric constants, although this increases the maximum capacitance value it also increases the minimum capacitance value so that the maximum-minimum capacitance ratio is unchanged.

An object of this invention is to increase the maximum to minimum capacitance ratio of a ceramic capacitor.

Another object of this invention is to provide a miniaturized variable capacitor suitable for radio tuning.

A further object of this invention is to insure proper alignment of the bearing faces of a rotor and stator in a miniaturized variable ceramic capacitor.

For the achievement of these objects this invention contemplates the use of a high dielectric constant material as the capacitor electrode spacing medium to achieve the maximum capacitance value and to introduce an air gap between the capacitor electrodes at the minimum setting of the capacitor. Further, the relatively movable capacitor elements are resiliently mounted to maintain alignment between the bearing faces of the capacitor elements during their relative movement.

The novel features of this invention are set forth in the appended claims. The invention itself, together with additional objects and advantages thereof, will be more clearly understood from a reading of the following description in connection with the accompanying drawings wherein a preferred embodiment of this invention is illustrated and in which:

FIG. 1 is an exploded perspective view;

FIG. 2 is a cross-sectional view taken along the axis of the capacitor;

FIG. 3 illustrates the maximum capacitance setting; and

FIG. 4 illustrates the minimum capacitance setting.

A variable or tuning capacitor 10 includes a suitable phenolic cap 12 having a centrally located aperture 14 which is counter-bored to provide a face 16. An annular washer 18, made of suitable resilient material such as rubber, is positioned within the cap 12. A connector tab 20 is positioned within the counter-bore and has an opening 22 in registry with the opening 14 of the cap. The connector tab includes an arm 24 which is passed through an aperture 26 in the face 16 and extends beneath the washer 18, holding it against the cap 12.

A rotor 28, of suitable ceramic material having a desired dielectric constant, preferably comprises two separate sections 30 and 32. In forming the two sections, a generally circular ceramic element is scored diametrically and cracked along the score mark into two pieces which when assembled in the cap 12 have an air gap 34 therebetween. The gap 34 has been enlarged in the drawings for better illustration. Prior to cracking the ceramic element, its opposed surfaces are ground to achieve a desired degree of flatness and a capacitor electrode 36 is then formed on one of its surfaces by applying a suitable conductive paint to a predetermined paint pattern. The diametric score mark is then made so that when the ceramic element is cracked the ends of electrode 36 terminate adjacent the air gap 34. In assembling the sections 30 and 32 into the cap, a small amount of conductive epoxy paint 38 is placed between the tab 20 and the electrode 36 and a spot of non-conductive epoxy cement 39 is placed on the rotor section 32. The rotor sections are then pressed against the rubber washer 18 with the washer forming an indentation to receive the arm 24 and intimately engage the rotor sections. In this manner the electrode 36 is electrically connected to the tab 20 and a mechanical connection is established between the rotor and the cap 12.

A stator 40, of suitable electric insulating material such as steatite, is positioned within the cap 12 and in abutting relation with the rotor 28. A capacitor electrode 42 which conforms to the electrode 36 is formed on the upper surface of the stator in a manner similar to that of electrode 36. The thickness of each electrode 36 and 42 has been greatly enlarged in the drawing and in actual practice is essentially a thin film on the rotor and stator.

A first terminal 44 is positioned in a diametrically extending groove 41 in the stator 40 and is connected to the stator by an eyelet 46 extending through an aperture 48. One end of eyelet 46 is soldered to the terminal 44 and its other end is electrically connected to the stator electrode 42 through a conductive strip 47, so that electrode 42 can be connected to one side of an electric line (not shown).

A resilient member 50 has a mid-portion 51 and three equally spaced arms 52 extending toward and engaging the underside of the stator 40. One of the arms 52 is positioned in the slot 41 and includes a terminal 54 which is adapted to be connected to the other side of the electric line. An eyelet 56 has a shouldered end engaging an electrically conductive washer 57 and supports the resilient member 50. The eyelet 56 extends through the stator, the rotor, the resilient washer and the cap, and has its other end rolled over and soldered to the connector tab 20 to establish an electrical connection between the terminal 54 and the connector tab 20 so that an electric circuit can be made to the rotor electrode 36. The eyelet 56 and resilient member 50 maintain the tuning capacitor 10 in assembled form, with the resilient member 50 biasing the stator, the rotor and the resilient washer into engagement within cap 12 and maintaining a predetermined pressure on those elements. The washer 18 provides a resilient seat so that proper alignment is maintained between the bearing faces of the rotor and the stator as they are moved relative to each other thereby contributing to the maintenance of consistent capacitor characteristics in the capacitor.

Cap 12 maintains the rotor elements in assembled relation and, in addition functions as an adjusting or tuning knob. By rotating the cap 12 the rotor 28 is rotated to move electrodes 36 and 42 into and out of alignment and to any desired relative position to vary the capacitance value. When the electrodes are in alignment (see FIG. 3) the maximum capacitance value is established, and when the rotor is rotated so that the electrodes are displaced 180 degrees from each other (see FIG. 4) the minimum capacitance value is established. In the minimum setting it will be noted that the gap 34 is intermediate the ends of the electrodes. Therefore, the ceramic material can be selected with a particular dielectric constant to give a desired maximum capacitance value and a low minimum capacitance value can be maintained through the introduction of the air gap between the electrodes in the minimum position. The electrode configuration can be varied as desired to provide a particular capacitance versus rotation curve. For example, in addition to the arcuate configuration of the electrodes of the preferred embodiment, the electrode configuration could approximate 360 degrees of Archimedes Spiral or might follow the formula used for straight line frequency air capacitors.

It will be appreciated that for purposes of illustration and description, the preferred embodiment has been greatly enlarged. By way of example of the miniaturization of a capacitor constructed in accordance with this invention, such a capacitor measures approximately 0.5 inch in diameter and 0.200 inch in thickness.

The discussion and illustration of this invention in connection with a particular preferred embodiment thereof has been intended for illustrative purposes only and should not be taken by way of limitation. Accordingly, it is intended in the appended claims to cover all modification and embodiments of this invention as fall within the true spirit and scope thereof.

What we claim is:

1. A variable capacitor comprising in combination, a disc rotor of dielectric material of generally circular form and having first and second oppositely facing surfaces including a generally arcuate electrode confined to a given angular area on said first surface, said electrode having an appreciable radial extent and radially extending openings through said rotor adjacent to the respective ends thereof in areas of said rotor which are free of said electrode, said openings extending radially substantially throughout the full radial extent of said electrode, a stator including an electrode conforming generally to the arcuate electrode of the rotor, means supporting said rotor in generally parallel relation to and for rotation relative to said stator to move said rotor electrode into and out of axial alignment with said stator electrode for adjustment of said capacitor between maximum and minimum capacitance settings, and for positioning said electrodes when out of overlapping relation so as to lie on opposite sides of said openings, thus to cooperate in establishing the minimum capacitance for said variable capacitor, and a resilient member engaging said first surface of said rotor to maintain operative relation between said second rotor surface and said stator during rotation.

2. The combination described in claim 1 wherein said dielectric rotor comprises two substantially semi-circular sections arranged in coplanar relation with the diametric edges thereof in spaced relation to provide an air gap therebetween, and with said rotor electrode confined to one only of said semi-circular sections, and wherein means is provided for biasing said resilient member, said rotor sections, and said stator into operative engagement.

3. A variable capacitor comprising, in combination, a generally circular ceramic rotor having oppositely facing surfaces and comprising two semi-circular segments arranged in coplanar relation with the diametrical edges thereof disposed in proximity to but relatively spaced from each other to provide an air gap therebetween, an electrode of predetermined pattern on one of the surfaces of one only of said segments, a stator member having a generally plane surface and carrying thereon an electrode of predetermined pattern, means for supporting said rotor in generally parallel relation to the electrode carrying surface of the stator for rotation relative thereto to dispose portions at least of said rotor electrode into and out of axial registration with the stator electrode for adjustment of said capacitor between maximum and minimum capacitance settings, and for disposing said electrodes on opposite sides of said air gap when said electrodes are out of axial registry with each other so that said air gap cooperates in establishing the minimum capacitance value for said variable capacitor.

4. A variable capacitor comprising the combination of cap, a generally circular ceramic rotor comprising two semi-circular sections having oppositely facing surfaces and positioned within said cap generally in coplanar relation with an air gap between the diametric edges of said sections, an arcuate electrode on one of the surfaces of one only of said rotor sections, a stator having a generally plane surface carrying an arcuate electrode and positioned within said cap with its electrode disposed in a plane generally parallel to that of the rotor and operatively adjacent to the other of said rotor surfaces, means connecting said cap and said rotor for rotation about an axis to move said rotor electrode into and out of axially overlapping relationship with the stator electrode for adjustment of said variable capacitor between maximum and minimum capacitance settings, said rotor electrode and said stator electrode when out of overlapping relation being disposed on opposite sides of said air gap to thereby cooperate in establishing the minimum capacitance value for said variable capacitor, resilient cushion means engaging said one surface of each of said rotor sections and positioned intermediate said one surface and said cap for maintaining said rotor segments in parallel coplanar relation to the stator, and resilient means for biasing said rotor segments, said stator, and said cap into operative engagement, said last-mentioned means including a resilient member engaged between the stator and the cap and exerting a resilient bias upon the stator, rotor, and resilient cushion means.

5. A variable capacitor comprising, in combination, a generally circular rotor disc of dielectric material having first and second oppositely facing surfaces and characterized by being formed of two semi-circular sections arranged in coplanar relation with an air gap between the opposed diametric edges thereof, electrode means on said first surface of one only of said sections, a stator having a generally plane surface arranged adjacent to and generally parallel with the second surface of said rotor and said stator surface including electrode means conforming generally to said electrode means on said rotor, and means supporting said rotor for rotation relative to and generally parallel with the electrode bearing surface of said stator to move said rotor electrode means into and out of overlapping axial relation with said stator electrode means for adjustment of said variable capacitor between maximum and minimum capacitance settings and for positioning said rotor and stator electrode means when said electrode means are out of overlapping relation on opposite sides of said air gap, so that said air gap cooperates in establishing the minimum capacitance value for said variable capacitor.

6. A variable capacitor comprising, in combination, a rotor of dielectric material and having opposed surfaces, said rotor provided with electrode means confined to an angular area on one only of said surfaces and including means in the area thereof free of said electrode defining an opening through said rotor at the opposite ends of said electrode, a stator including electrode means conforming to said rotor electrode means and positioned operatively adjacent the other of said rotor surfaces, and means supporting said rotor for rotation relative to said stator to move said rotor electrode means into and out of overlapping relation with said stator electrode for adjustment of said variable capacitor between a maximum capacitance setting wherein said rotor electrode means overlaps said stator electrode means and a minimum capacitance setting wherein said electrode means are out of overlapping relationship and wherein said rotor and stator electrode means when said electrode means are out of overlapping relationship are disposed on opposite sides of said opening to thereby cooperate in establishing the minimum capacitance value for said variable capacitance.

7. A variable capacitor comprising, in combination, a movable dielectric member having oppositely facing surfaces, said dielectric member including an electrode on and confined to a given area on one only of said surfaces, said rotor being provided with at least one opening through said dielectric member between said given area and the remainder of said one surface, said opening being dimensioned and positioned to provide an air gap completely separating the electrode bearing portion of the rotor from the remainder of said one surface aligned with said electrode in the direction of movement thereof, a fixed electrode positioned adjacent the other of said oppositely facing surfaces of said dielectric member and confined to an area corresponding generally to said given area, and means for moving said movable dielectric member relative to said fixed electrode to move the electrode on said dielectric member into and out of overlapping relation with said fixed electrode for adjustment of said variable capacitor between maximum and minimum capacitance settings and for positioning said electrodes when they are out of overlapping relation on opposite sides of said opening so that said opening cooperates in establishing the minimum capacitance for said variable capacitor.

References Cited in the file of this patent
UNITED STATES PATENTS

| | | |
|---|---|---|
| 2,499,634 | Ehlers et al. | Mar. 7, 1950 |
| 2,688,177 | Wagner | Sept. 7, 1954 |
| 2,913,644 | Bleazy | Nov. 17, 1959 |